G. R. DUVAL.
VEHICLE RUNNING-GEAR.

No. 194,341. Patented Aug. 21, 1877.

2 Sheets—Sheet 2.

WITNESSES:
E. Wolff
J. H. Scarborough

INVENTOR:
G. R. Duval
BY
ATTORNEYS.

N. PETERS, PHOTO-LITHOGRAPHER, WASHINGTON, D. C.

UNITED STATES PATENT OFFICE.

GEORGE R. DUVAL, OF OREGON CITY, OREGON.

IMPROVEMENT IN VEHICLE RUNNING-GEAR.

Specification forming part of Letters Patent No. 194,341, dated August 21, 1877; application filed April 9, 1877.

*To all whom it may concern:*

Figure 1:
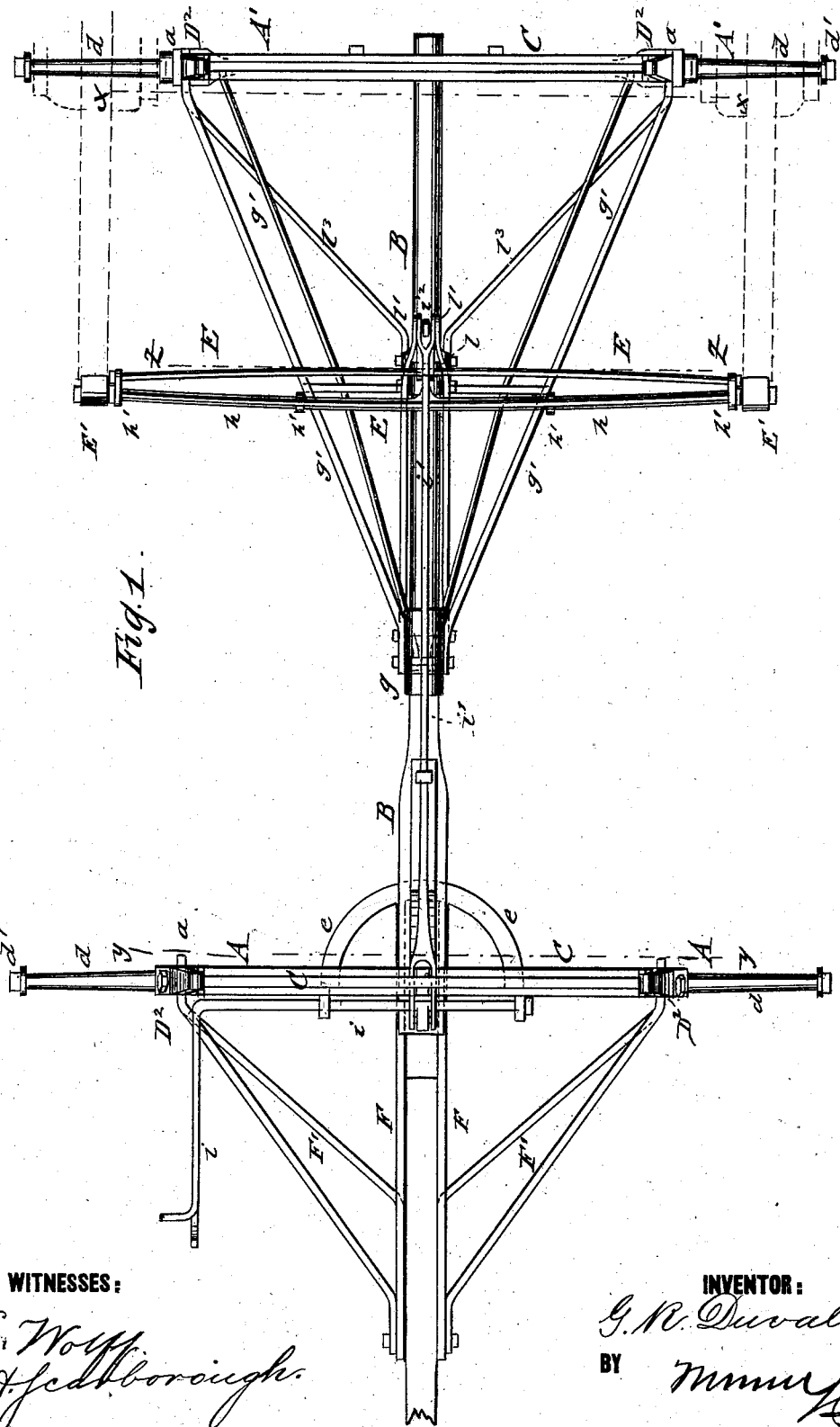
Figure 2:
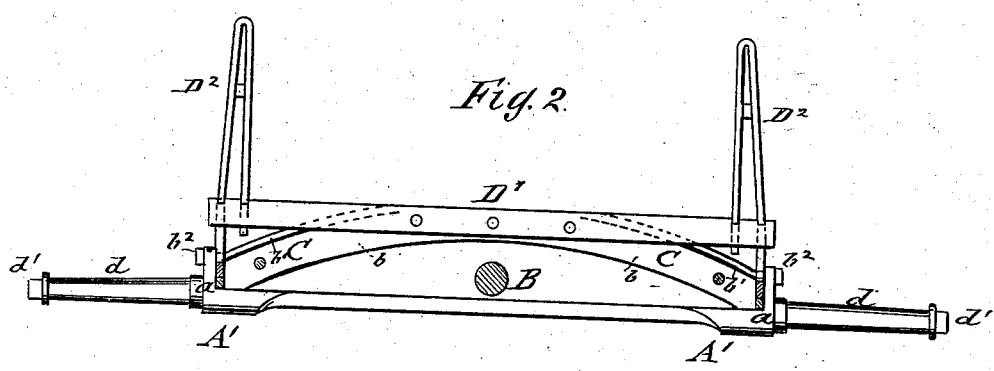
Figure 3:
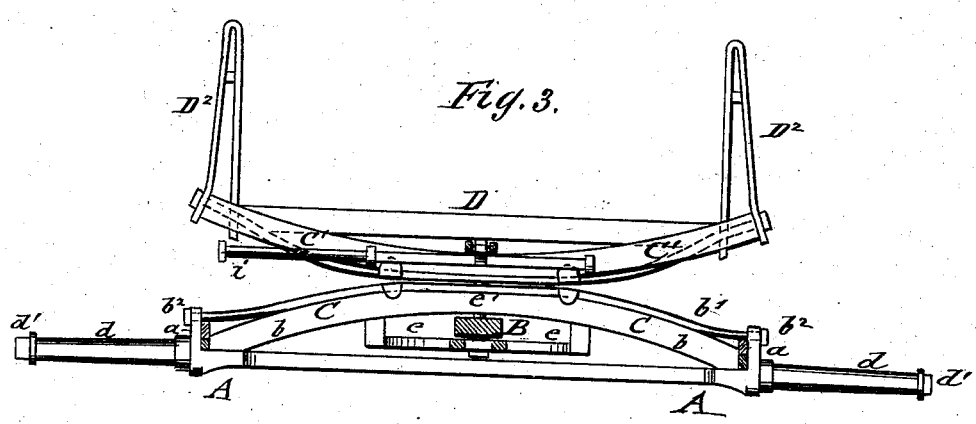
Figure 4:
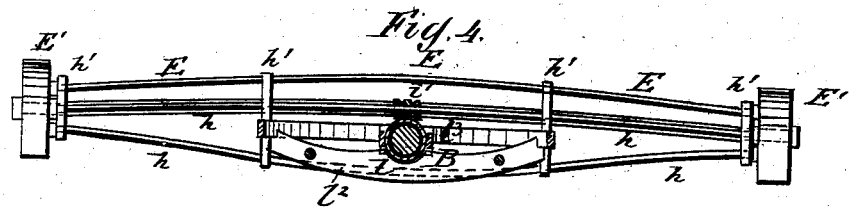
Figure 5:
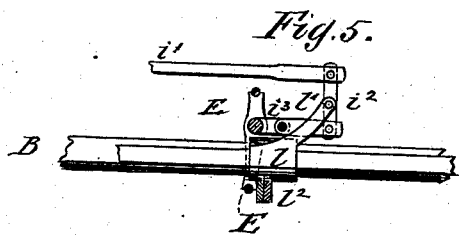

Be it known that I, GEORGE R. DUVAL, of Oregon City, in the county of Clackamas and State of Oregon, have invented a new and Improved Vehicle, of which the following is a specification:

In the accompanying drawings, Figure 1 represents a top view of my improved vehicle. Figs. 2 and 3 are vertical transverse sections of the same on lines $x$ $x$ and $y$ $y$, showing, respectively, the rear and front axles and bolsters in elevation. Fig. 4 is a transverse section on line $z$ $z$, showing the brake in elevation; and Fig. 5 is a detail side view of the operating lever mechanism of the brake.

Similar letters of reference indicate corresponding parts.

The invention relates to an improved construction of gear for vehicles of all kinds, which admits the employment of iron or other metal for all the parts, and produces a strong and substantial supporting and connecting gear thereby.

The invention will first be described in connection with the drawings, and then pointed out in the claims.

In the drawings, A represents the front and A' the hind axle; B, the connecting-reach, and C the arched trusses that are secured to slotted lugs or seats $a$ of the axles, being made of two parallel arched iron plates or tubes, $b$, that are securely held in place between the seats $a$ by top brace-rods $b^1$, whose ends are tightly secured by nuts $b^2$.

The axle may be formed of hollow pipes, with interior truss-rods, when extra strength is required, the seats carrying, in outside grooves, the thimbles $d$, which are securely attached by outer screws $d'$.

To the arch C of the front axle is attached the fifth-wheel $e$, that is bolted thereto to support the front end of reach B, through the end of which the king-bolt $e'$ passes in the customary manner.

The front bolster C' is constructed in similar manner as the truss of the front axle—namely, of arched parallel plates or bars supported in end seats or lugs, and braced by a curved stiffening-rod and screw-nuts at the ends.

The bolster carries the lateral horizontal bar D, fastened by cross-bolts, as shown in Fig. 3. The front bolster acts in the manner of a truss, and is supported in the center by the head of king-bolt $e'$.

The horizontal cross-bar $D^1$ of the rear axle A' is attached to the extended lugs or seats $b$ by fastening-nuts, and to the arched truss by cross-bolts, as shown in Fig. 2.

The wagon-body rests on the front and rear bars D $D^1$, and between the uprights or standards $D^2$, which are bent of flat iron, braced by cross-studs, and secured rigidly to the ends of bars D $D^1$ by fastening bolts and nuts.

The tongue is secured between hounds F, of flat bar-iron, which are stiffened by side braces F', connecting with the front axle A, as shown in Fig. 1.

The reach B is made of iron tube or gas-pipe of suitable strength, and clamped in suitable manner to a coupling sleeve or thimble, $g$, by collars and set-screws, being capable of adjustment to different length by means of the adjustable collars and screws. The coupling-sleeve $g$ is connected and stiffened by side braces $g'$ that extend back to the rear axle and arched truss.

The brake-bar E is constructed in analogous manner of curved cross-rods $h$, that are connected by end and intermediate stays $h'$, and provided with suitable brake-shoes E' at the outer ends. The brake E E' is operated by a suitable crank-lever at the front axle from the driver's seat, the crank-lever being connected by a lever-rod, $i^1$, with a short fulcrumed lever, $i^2$, that swings in the arms $l^1$ of a sleeve, $l$, connected, by slide rods, to coupling-sleeve, and being secured rigidly to a supporting-brace, $l^2$, of brace-rods $g'$, and by braces $l^3$ to the rear axle, the reach sliding in sleeve $l$, if required.

The short fulcrumed lever $i^2$ operates, by a jointed link-connection, $i^3$, with the center cross-rod of the brake-frame, the brake throwing the shoes, by swinging the crank-lever $i$ downward, and by bringing the lower cross-rod of the brake-frame into contact with the brace-bar $l^2$ into inclined position tightly against the wheels. The brake is taken off from the wheels by swinging the crank-lever up, which carries the connecting-rod back, and raises the brake-frame, so as to remove the brake-shoes from the wheels.

In this manner a strong, substantial, and firmly-braced iron running-gear for farm, lumber, and other wagons requiring a certain strength, is obtained, which may, by slight modifications, be also used for vehicles of all description, imparting to them a light and pleasant appearance in place of the clumsy and heavy wooden wagons at present in use.

Having thus described my invention, I claim as new and desire to secure by Letters Patent—

1. The combination, with the rear axle, of an arch, C, having brace-rod $b$, and passing up into the bolster, as shown and described.

2. The combination, with the front axle and bolster, of the two arches C C', reversed and touching on the parts of their greatest convexity, as and for the purpose specified.

3. The combination of coupling-sleeve $g$ and brake-sleeve $l$, back of the same, with lateral and rear extending brace-rods of rear axle, substantially as set forth.

GEORGE R. DUVAL.

Witnesses:
J. S. APPERSON,
JOHN H. MOORE.